United States Patent [19]
Gill

[11] Patent Number: 6,118,622
[45] Date of Patent: *Sep. 12, 2000

[54] TECHNIQUE FOR ROBUST RESETTING OF SPIN VALVE HEAD

[75] Inventor: Hardayal Singh Gill, Portola Valley, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/854,978

[22] Filed: May 13, 1997

[51] Int. Cl.[7] .................................................. G11B 5/39
[52] U.S. Cl. ............................................................ 360/113
[58] Field of Search ..................................... 360/113, 110

[56] References Cited

U.S. PATENT DOCUMENTS

| | | | |
|---|---|---|---|
| 4,103,315 | 7/1978 | Hempstead et al. | 360/110 |
| 4,809,109 | 2/1989 | Howard et al. | 360/113 |
| 5,027,243 | 6/1991 | Gill et al. | 360/113 |
| 5,159,513 | 10/1992 | Dieny et al. | 360/113 |
| 5,193,038 | 3/1993 | Smith | 360/113 |
| 5,206,590 | 4/1993 | Dieny et al. | 324/252 |
| 5,231,314 | 7/1993 | Andrews | 307/480 |
| 5,262,914 | 11/1993 | Chen et al. | 360/113 |
| 5,264,980 | 11/1993 | Mowry et al. | 360/113 |
| 5,287,238 | 2/1994 | Baumgart et al. | 360/113 |
| 5,301,079 | 4/1994 | Cain et al. | 360/113 |
| 5,341,261 | 8/1994 | Dieny et al. | 360/113 |
| 5,440,233 | 8/1995 | Hodgson et al. | 324/252 |
| 5,471,358 | 11/1995 | Tadokoro et al. | 360/113 |
| 5,508,866 | 4/1996 | Gill et al. | 360/113 |

(List continued on next page.)

FOREIGN PATENT DOCUMENTS

| | | |
|---|---|---|
| 0 511 752 | 11/1992 | European Pat. Off. . |
| 0628835A2 | 4/1994 | European Pat. Off. ......... G01R 33/06 |
| 0676746A1 | 3/1995 | European Pat. Off. ........... G11B 5/39 |
| 4358310 | 12/1992 | Japan ................................. G11B 5/39 |
| 6060336 | 3/1994 | Japan ................................. G11B 5/39 |
| 6150259 | 5/1994 | Japan ................................. G11B 5/39 |
| WO96/38740 | 12/1996 | WIPO ............................. G01R 33/095 |

OTHER PUBLICATIONS

*IBM Technical Disclosure Bulletin*, vol. 30, No. 8, Jan. 1988, "Close Proximity Coupled Differential Magneto–Resistive Read Head Structure", A. W. Vinal.

(List continued on next page.)

*Primary Examiner*—Craig A. Renner
*Attorney, Agent, or Firm*—Gray Cary Ware Freidenrich LLP; Ervin F. Johnson

[57] ABSTRACT

A process for resetting or initially establishing the magnetic orientation of one or more spin valves in a magnetoresistive read head with improved robustness. The spin valve includes subcomponents such as an antiferromagnetic layer, a ferromagnetic pinned layer, a conductive layer, a free layer, and a hard bias layer. A first external magnetic field is first applied to the spin valve sensor, this field having a first orientation relative to the spin valve sensor. During application of the first external magnetic field, a pulse of electrical current is directed through the spin valve sensor in a first direction, preferably parallel to the magnetic orientation of the external field. The current waveform brings the antiferromagnetic layer of the spin valve past its blocking temperature, freeing its magnetic orientation. The first external field exerts a robust bias upon the antiferromagnetic layer in the desired direction. Depending upon its flow direction, the current pulse may contribute an internal magnetic field that cooperates in magnetically biasing the antiferromagnetic layer as desired. After the current pulse, the antiferromagnetic layer cools below its blocking temperature, retaining the desired biasing. After the first external field is removed, and a second external magnetic field may be applied to the spin valve sensor for a predetermined time. The second external field is oriented to magnetically direct the hard bias layer of the sensor, thereby establishing the quiescent magnetization of the sensor's ferromagnetic free layer.

15 Claims, 5 Drawing Sheets

U.S. PATENT DOCUMENTS

| | | |
|---|---|---|
| 5,528,440 | 6/1996 | Fontana et al. .................... 360/113 |
| 5,557,491 | 9/1996 | Gill ................................... 360/113 |
| 5,561,368 | 10/1996 | Dovek et al. ....................... 324/252 |
| 5,576,908 | 11/1996 | Garfunkel et al. .................. 360/66 |
| 5,589,768 | 12/1996 | Ishiyama et al. .................. 324/207.21 |
| 5,650,887 | 7/1997 | Dovek et al. ...................... 360/113 X |
| 5,664,319 | 9/1997 | Abboud et al. .................... 29/603.08 |
| 5,772,794 | 6/1998 | Uno et al. .......................... 360/113 |
| 5,798,896 | 8/1998 | Araki et al. ....................... 360/113 |

OTHER PUBLICATIONS

*J. Appl. Phys.*, vol. 76, No. 9, Nov. 1, 1994, "Distribution of Blocking Temperature in Bilayered $Ni_{81}Fe_{19}NiO$ Films", S. Soeya et al., pp. 5356–5360.

*J. Appl. Phys.*, vol. 79, No. 8, Apr. 15, 1996, "Exchange Coupling of Sputter Deposited NiCo–0/NiFe Thin Films", M. Tan et al., pp. 5012–5014.

*IEEE Transactions on Magnetics*, vol. 32, No. 1, Jan. 1996, "Spin–Valve Heads Utilizing Antiferromagnetic NiO Layers", Y. Hamakawa et al., pp. 149–155.

*Appl. Phys. Lett.*, Dec. 2, 1996, "NiMn–pinned Spin Valves with High Pinning Field Made by Ion Beam Sputtering", S. Mao et al., pp. 3593–3595.

*Journal of Magnetism and Magnetic Materials*, 1994, "Giant Magnetoresistance in Spin–Valve Multilayers", B. Dieny, pp. 335–359.

*IEEE Transactions on Magnetics*, vol. 28, No. 5. Sep. 1992, "Giant Magnetoresistance: A Primer", R. L. White, pp. 2482–2487.

TECHNIQUE FOR ROBUST RESETTING OF SPIN VALVE HEAD

BACKGROUND OF THE INVENTION

1. Field of the Invention

The present invention relates to sensors for reading magnetic flux transitions from magnetic media such as disks and tape. More particularly, the invention concerns a technique for resetting the magnetic orientation of one or more spin valves in a magnetoresistive read head.

2. Description of the Related Art

A magnetoresistive ("MR") sensor detects magnetic field signals by measuring changes in the resistance of an MR element, fabricated of a magnetic material. Resistance of the MR element changes as a function of the strength and direction of magnetic flux being sensed by the element. Conventional MR sensors operate on the basis of the anisotropic magnetoresistive ("AMR") effect, in which a component of the element's resistance varies as the square of the cosine of the angle between the magnetization in the element and the direction of sense or bias current flow through the element.

MR sensors are useful in magnetic recording systems where recorded data is read from a magnetic medium. In particular, the external magnetic field from the recorded magnetic medium (the signal field) causes a change in the direction of the magnetization of an MR head. This in turn causes a change in electrical resistance in the MR read head and a corresponding change in the sensed current or voltage.

A variety of magnetic multilayered structures demonstrate a significantly higher MR coefficient than an AMR sensor. This effect is known as the giant magnetoresistive ("GMR") effect. The essential features of these structures include at least two ferromagnetic metal layers separated by a nonferromagnetic metal layer. This GMR effect has been found in a variety of systems, such as iron-chromium (FeCr) and cobalt-copper (CoCu) multilayers exhibiting strong antiferromagnetic coupling of the ferromagnetic layers. The GMR effect is also found in essentially uncoupled layered structures in which the magnetization orientation in one of the two ferromagnetic layers is fixed or pinned. The physical origin is the same in all types of GMR structures: the application of an external magnetic field causes a variation in the relative orientation of the magnetizations of neighboring ferromagnetic layers. This in turn cases a change in the spin-dependent scattering of conduction electrons and thus the electrical resistance of the structure. The resistance of the structure thus changes as the relative alignment of the magnetizations of the ferromagnetic layers changes.

One specific application of GMR is the spin valve sensor. Spin valve sensors include a nonmagnetic conductive layer called a "spacer" layer, sandwiched between "pinned" and "free" ferromagnetic layers. The magnetization of the pinned layer is pinned 90° to the quiescent magnetization of the free layer. Unlike the pinned layer, the free layer has a magnetic moment that freely responds to external magnetic fields, including those from a magnetic disk.

A spin valve sensor may be used to read data by directing a sense current through the free, spacer, and pinned layers of the sensor. The resistance of the spin valve sensor changes in proportion to rotation of the magnetic free layer (which moves freely) relative to the pinned layer (which is fixed in place). Such changes in resistance are detected and ultimately processed as playback signals.

In a typical spin valve MR sensor, the free and pinned layers have equal thicknesses, but the spacer layer is one half as thick as either of the free or pinned layers. An exemplary thickness of each of the free and pinned layers is 50 Å and an exemplary thickness of the spacer layer is 25 Å.

As mentioned above, the magnetization of the pinned layer is pinned 90° to the magnetization of the free layer. Pinning may be achieved by depositing the ferromagnetic layer to be pinned onto an antiferromagnetic layer to create an interfacial exchange coupling between the two layers. The antiferromagnetic layer may be constructed from a group of materials which include FeMn, NiMn, and NiO.

The spin structure of the antiferromagnetic layer can be aligned along a desired direction (in the plane of the layer) by heating beyond the "blocking" temperature of the antiferromagnetic layer and cooling in the presence of a magnetic field. The blocking temperature is the temperature at which the magnetic spins within a material lose their orientation. In other words, a material's blocking temperature is reached when exchange anisotropy vanishes because the local anisotropy of the antiferromagnetic layer, which decreases with temperature, has become too small to anchor the antiferromagnetic spins to the crystallographic lattice. The blocking temperatures of many antiferromagnetic materials ranges from about 160° to 200° C. Thus, when the blocking temperature of the antiferromagnetic material is exceeded, the spins of the antiferromagnetic layer lose their orientation causing the first ferromagnetic layer to no longer be pinned.

Unlike the pinned layer, the free layer has a magnetic moment that freely responds to external magnetic fields, including those from a magnetic disk. The thickness of the spacer layer is chosen to be less than the mean free path of conduction electrons through the sensor. With this arrangement, a portion of the conduction electrons are scattered by the interfaces of the spacer layer with the pinned and free layers. When the magnetizations of the pinned and free layers are parallel with respect to one another, scattering is minimal; when the magnetizations of the pinned and free layers are antiparallel, scattering is maximized. Due to changes in scattering, the resistance of the spin valve sensor changes in proportion to the cosine of the angle between the magnetizations of the pinned and free layers.

A number of U.S. patents disclose spin valve sensors. One patent, for example, shows a spin valve sensor in which at least one of the ferromagnetic layers is Co an alloy thereof, where the magnetizations of the two ferromagnetic layers are maintained substantially perpendicular to each other at zero externally applied magnetic field by exchange coupling of the pinned ferromagnetic layer to an antiferromagnetic layer. See, e.g., U.S. Pat. No. 5,159,513, assigned to International Business Machines Corp. Another patent discloses a basic spin valve sensor where the free layer is a continuous film having a central active region and end regions. The end regions of the free layer are exchange biased by exchange coupling to one type of antiferromagnetic material, and the pinned layer by exchange coupling to a different type of antiferromagnetic material. See, e.g., U.S. Pat. No. 5,206,590.

A read head employing a spin valve sensor, called a "spin valve read head", may be combined with an inductive write head to form a "combined" head. The combined head may have the structure of either a merged head, or a piggyback head. In a merged head a single layer serves as a shield for the read head and as a first pole piece for the write head. A piggyback head has a separate layer which serves as the first pole piece for the write head. In a magnetic disk drive an air bearing surface ("ABS") of a combined head is supported adjacent a rotating disk to write information on or read information from the disk. Information is written to the rotating disk by magnetic fields which fringe across a gap between the first and second pole pieces of the write head.

To read data, a sense current is directed through the free, spacer, and pinned layers of the sensor. The resistance of the spin valve sensor changes in proportion to relative rotation of the magnetic moments of the free and pinned layers. Such changes in resistance are detected and ultimately processed as playback signals.

Known spin valve sensors provide a number of benefits, most notably their significantly higher MR coefficient in comparison to AMR sensors. However, spin valves are sensitive to heating, which can disorient the magnetic spins in both antiferromagnetic and ferromagnetic films of the spin valve. This occurs whenever the heat source exceeds the blocking temperature of the antiferromagnetic films.

The chief sources of heat are electrostatic discharge and electrostatic overstress. Electrostatic discharge often ruins a sensor completely, whereas electrostatic overstress usually reduces the sensor's efficiency. These blocking temperatures can be reached by certain thermal effects during operation of the disk drive, such as an increase in the ambient temperature inside the drive, heating of the spin valve sensor due to the bias current, and rapid heating of the spin valve sensor due to the head carrier contacting asperities on the disk. In addition, magnetic disk drives are especially vulnerable to electrostatic discharge during the manufacturing process, such as during fabrication and assembly. If any of these thermal effects cause the spin valve sensor to exceed the antiferromagnet's blocking temperature, the magnetization of the pinned layer will no longer be pinned in the desired direction. This changes the spin valve sensor's response to an externally applied magnetic field, resulting in errors in data read from the disk.

A number of precautions are taken to avoid the dangers of heat-induced magnetic disorientation. For example, during the manufacturing process technicians can electrically ground themselves and their workpieces. Nonetheless, damage to spin valve sensors still occurs under some circumstances. Electric over stress can change pinned layer magnetization orientation. This is due to the fact that the heating by the current raises the temperature of the head near to the blocking temperature. Since the exchange field drops to near zero around the blocking temperature, antiferromagnetic layer spins around a neighboring ferromagnetic layer (pinned layer) magnetization will assume the direction of the field generated by the current. However, the field from the sense current is only of limited value (around only about 20 Oe). Therefore, if the pinned layer has coercivity in addition to the exchange field, and if the coercivity value is larger than the field from the current, then the field from the current will not be able to properly orient the pinned layer magnetization. Coercivity, in contrast to the exchange field, does not drop so strongly with temperature; as a result, coercivity can be fairly high, even at elevated temperatures. In addition, since the field from the current is non-uniform over the active area of the sensor it does not set the magnetization of the pinned layer over the entire pinned layer. As a result of these factors, electric overstress can severely diminish or disable the functionality of a spin value sensor.

SUMMARY OF THE INVENTION

Broadly, the present invention concerns a process for resetting the magnetic orientation of one or more spin valves in one or more magnetoresistive read heads. Each spin valve includes subcomponents such as a antiferromagnetic layer, a ferromagnetic pinned layer, a conductive layer, a free layer, and a hard bias layer.

For each spin valve, a first external magnetic field is first applied to the spin valve sensor. This field has a first orientation relative to the spin valve sensor. During application of the first external magnetic field, a waveform of electrical current is directed through the spin valve sensor. The electrical current brings the antiferromagnetic layer of the spin valve past its blocking temperature, freeing its magnetic orientation. The external field exerts a robust bias upon the antiferromagnetic layer in the desired direction.

The invention may be applied, for example, to properly orient the magnetization of the pinned layer just before the heads are put into the disk drive enclosure. The actuator assembly ("head stack") is emersed in a large external field. The external field is perpendicular to the air bearing surface of the head. With external field on, the heads are pulsed with the electric current for very brief duration, e.g., 60 to 120 ns. The current pulse raises the temperature near to the blocking temperature, and external field freezes the pinned layer magnetization as the heads cool below the blocking temperature.

After the current pulse, the antiferromagnetic layers cool below their blocking temperatures, and retain the desired biasing. The external field is removed, and a second external magnetic field is applied to the spin valve sensor for a predetermined time. The second external field is oriented to magnetically direct the sensor's hard bias layers, thereby establishing the quiescent magnetization of the sensor's ferromagnetic free layer.

The invention affords its users with a number of distinct advantages. Chiefly, the invention provides a more robust technique for resetting a spin valve sensor that has suffered magnetic disorientation due to electrostatic trauma. The external magnetic field provides a stronger, more uniform biasing field than the electrical current of the pulse alone. Consequently, after a spin valve is reset according to the invention it reads data with greater sensitivity and accuracy. The invention also provides a number of other benefits, as discussed below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

The present invention concerns a technique for robustly resetting the magnetization direction of a spin valve head.

This technique may be implemented, for example, in the hardware environment described below.

Spin Valve Sensor—Materials

Figure 1:
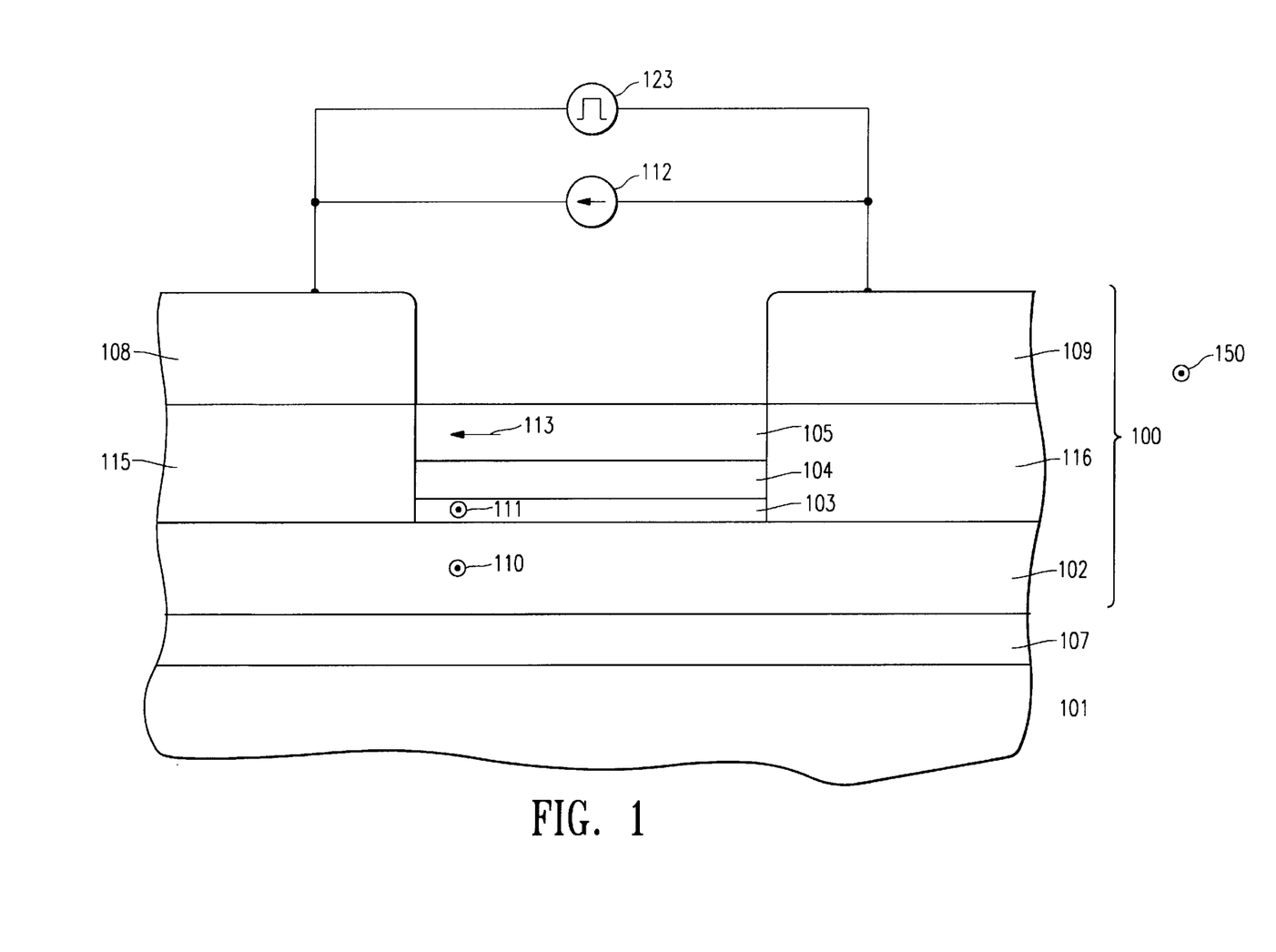
FIG. 1 is a cross-sectional plan view of a spin valve sensor according to the invention.

FIG. 1 depicts an example of a spin valve sensor 100 upon which the invention may be practiced. The view of FIG. 1 depicts a plan view of the air bearing surface of a substrate 101 containing the spin valve 100. The substrate's air bearing surface normally rides upon a cushion of air, which separates it from a magnetic data storage medium such as a disk or tape.

The sensor 100 includes a plurality of substantially parallel layers including an antiferromagnetic layer 102, a ferromagnetic pinned layer 103, a conductive layer 104, and a ferromagnetic free layer 105. The sensor 100 also includes hard bias layers 115–116, the operation of which is discussed in greater detail below. The sensor 100 is deposited upon an insulator 107, which lies atop the substrate 101. Adjacent layers preferably lie in direct atomic contact with each other.

The antiferromagnetic layer 102 comprises a type and thickness of antiferromagnetic substance suitable for use as a pinned layer in spin valves, e.g., a 400 Å layer of NiO. The ferromagnetic pinned layer 103 comprises a type and thickness of ferromagnetic substance suitable for use in spin valves, e.g., about 10–40 Å of Co. The conductor layer 104 comprises a type and thickness of conductive substance suitable for use in spin valves, e.g., about 20–30 Å of Cu. The ferromagnetic free layer 105 comprises a type and thickness of ferromagnetic substance suitable for use as a free layer in spin valves, e.g., about 30–150 Å of NiFe. The hard bias layers 115–116 provide the free layer 105 with a desired quiescent magnetization. The hard bias layers 115–116 preferably comprise a magnetic material with high coercivity, such as CoPtCr.

Despite the foregoing detailed description of the sensor 100, the present invention may be applied using many different sensor arrangements in addition to this example. For example, ordinarily skilled artisans having the benefit of this disclosure will recognize various alternatives to the specific materials and thickness described above.

Spin Valve Sensor—Magnetization

The sensor 100 exhibits a predefined magnetization. Magnetization of the sensor 100, including the ferromagnetic layers 103/105 and the antiferromagnetic layer 102, is performed in accordance with the invention. The sensor 100 may be magnetized prior to initial operation, such as during the fabrication or assembly processes. Or, the sensor 100 may be magnetized after some period of operating the sensor 100, where the sensor 100 loses its magnetic orientation due to a traumatic high temperature event such as electrostatic discharge. A process for magnetization of the sensor 100 is discussed in greater detail below.

Whether magnetized before or after initial operation of the sensor 100, the magnetized components of the sensor 100 are ultimately given the same magnetic configuration. In particular, the antiferromagnetic layer 102 has a magnetic orientation in a direction 110. For ease of explanation, conventional directional shorthand is used herein, where a circled dot indicates a direction coming out of the page (like an arrow's head), and a circled "x" indicates a direction going into the page (like an arrow's tail). The neighboring ferromagnetic pinned layer 103 has a magnetic moment pinned in a parallel direction 111, due to antiferromagnetic exchange coupling between the layers 102–103.

Unlike the pinned layer 103, the free layer 105 has a magnetic moment that freely responds to external magnetic fields, such as those from a magnetic storage medium. The free layer 105 responds to an external magnetic field by changing its magnetic moment, which in turn changes the resistance of the spin valve 100. In the absence of any other magnetic fields, the free layer 105 orients itself in a direction 113, which is oriented 90° to the directions 110–111. This quiescent magnetization direction is due to biasing of the free layer 105 by the hard bias layers 115–116.

Electrical Current in the Spin Valve

The sensor 100 may also include various accessories to direct electrical current and magnetic fields through the sensor 100. A small but constant sense current, for example, is directed through the sensor 100 to provide a source of scattering electrons for operation of the sensor 100 according to the GMR effect. At different times, a relatively large current pulse or "waveform" is directed through the sensor 100 to establish the magnetization direction of the sensor 100. FIG. 1 also depicts the sensor 100 in relation to the various features that help direct current through the sensor 100.

The sensor 100 is attached to a pair of complementary leads 108–109 to facilitate electrical connection to a sense current source 112. The leads 108–109 also facilitate electrical connection to a pulse current source 123. The leads 108–109 preferably comprise 500 Å of Ta with a 50 Å underlayer of Cr, or another suitable thickness and type of conductive material. The attachment of leads to magnetoresistive sensors and spin valves is a well known technique, familiar to those of ordinary skill in the art.

Establishing Magnetization Direction

Via the leads 108–109, the pulse current source 123 directs an electrical pulse current through the layers 103–105. Chiefly, the pulse current heats the antiferromagnetic layer 102 past its blocking temperature, as explained in greater detail below. For an additional measure of magnetization biasing, the pulse current source 123 may be configured to provide pulse current in an appropriate direction to enhance biasing of the antiferromagnetic layer 102 in the direction 110. Using the illustrated example, pulse current for this purpose flows from the lead 109 to the lead 108.

To satisfy the foregoing purposes, the current source 123 comprises a suitable device to provide a current pulse of sufficient amplitude and duration to bring the antiferromagnetic layer 102 past its blocking temperature thereby freeing the magnetic orientations of this layer as well as the associated ferromagnetic pinned layer 103. As an example, the current pulse may comprise a 17–18 mA signal lasting about 60 to 120 nanoseconds.

It is emphasized that ordinarily skilled artisans having the benefit of this disclosure will recognize that certain changes may be made to the biasing and pinning of the various sensor components without departing from the scope of the invention. Furthermore, more particular explanation is provided below concerning the particular manner and effect of biasing the sensor 100.

Sense Current

Via the leads 108–109, the current source 112 directs a small, constant electrical current through the layers 103–105 during ongoing operation of the sensor 100. As an example, the sense current may be about 4–10 mA D.C.

Output Sensing

The sensor 100 functions because the resistance of the sensor 100 changes during the detection of an external magnetic field. Other circuitry, discussed below, quantifies this change in resistance to generate a "playback" signal representative of the detected magnetic flux transitions. The resistance of the sensor 100 is determined by measuring the voltage drop across occurring between the leads 108–109, and dividing this voltage by the sense current. Io measure the voltage drop the free layer 105 may be coupled to a voltage sensor (not shown) such as a differential amplifier or another appropriate voltage sensor. Alternatively, a sense voltage may be placed across the leads 108–109, with measurement taken of the resultant current therebetween.

Magnetic Disk Storage System

Figure 2:
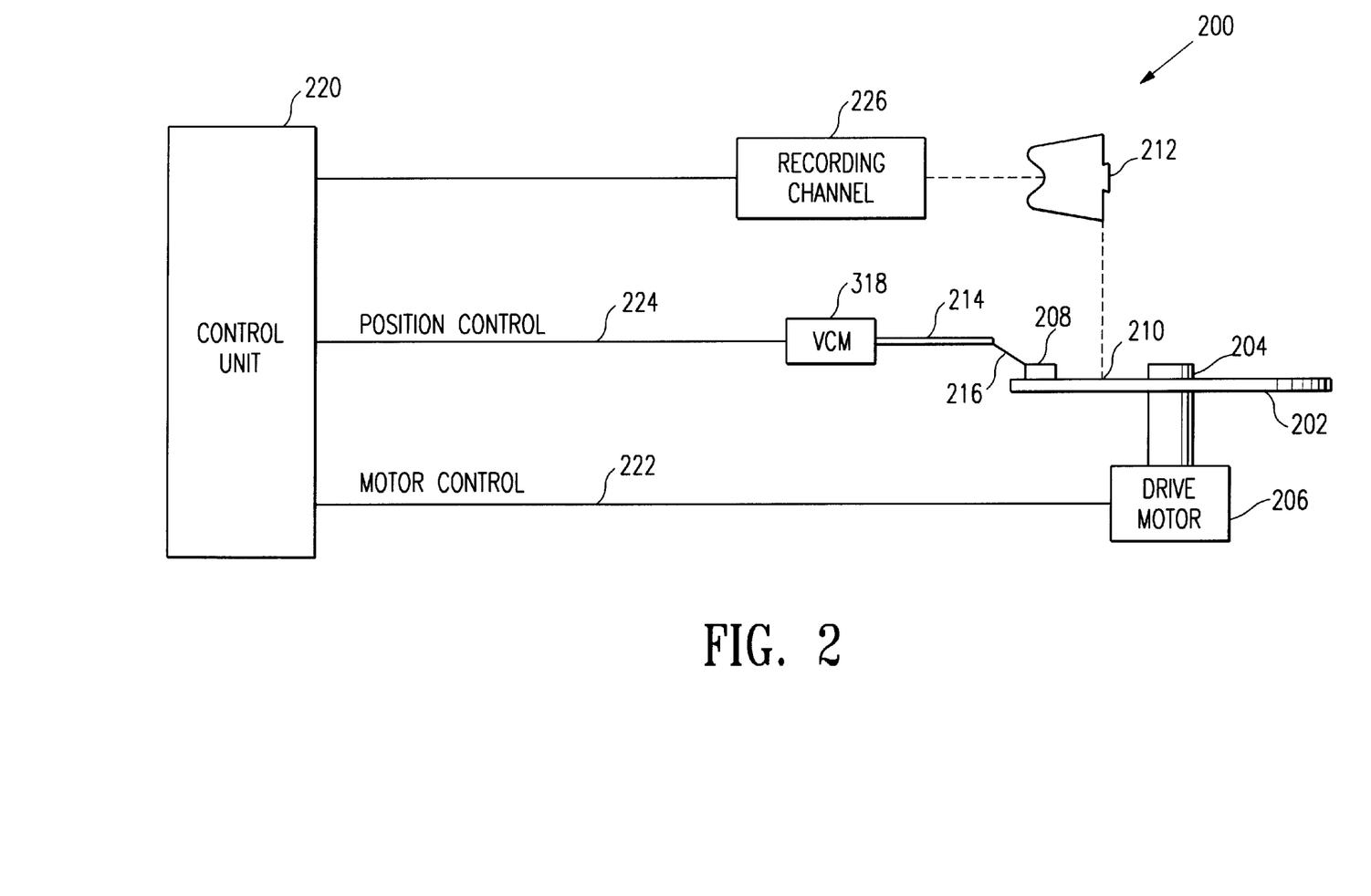
FIG. 2 is a block diagram of a magnetic disk storage system according to the invention.

FIG. 2 depicts an example of a magnetic disk storage system embodying sensors such as the sensor 100. Ordinarily skilled artisans will recognize, however, that invention is also applicable to other magnetic recording systems than the specific embodiment 200 illustrated in FIG. 2.

A magnetic disk storage comprises at least one rotatable magnetic disk 202 is supported on a spindle 204 and rotated by a disk drive motor 206 with at least one slider 208 positioned on the disk 202, each slider 208 supporting one or more magnetic read/write heads. The magnetic recording media on each disk is in the form of an annular pattern of concentric data tracks (not shown) on the disk 202. As the disk 202 rotates, the sliders 208 are moved radially in and out over the disk surface 210 so that the heads 212 may access different portions of the disk where desired data is recorded. Each slider 208 is attached to an actuator arm 214 by means of a suspension 216. The suspension 216 provides a slight spring force which biases the slider 208 against the disk surface 210. Preferably, the actuator arm 214, suspension 216, and slider 208 are embodied in an integrated suspension assembly constructed in accordance with the invention, such as ones of the various embodiments described in detail above. Each actuator arm 214 is attached to an actuator means 218 The actuator means 218 as shown in FIG. 2 may be a voice coil motor ("VCM"), for example. The VCM comprises a coil moveable within a fixed magnetic field, the direction and velocity of the coil movements being controlled by the motor current signals supplied by a controller. During operation of the disk storage system, the rotation of the disk 202 generates an air bearing between the slider 208 and the disk surface 210 which exerts an upward force or lift on the slider. The air bearing thus counterbalances the slight spring force of the suspension 216 and supports the slider 208 off and slightly above the disk surface by a small, substantially constant spacing during operation.

The various components of the disk storage system are controlled in operation by control signals generated by control unit 220, such as access control signals and internal clock signals. Typically, the control unit 220 comprises logic control circuits, storage means and a microprocessor, for example. The control unit 220 generates control signals to control various system operations such as drive motor control signals on line 222 and head position and seek control signals on line 224. The control signals on line 224 provide the desired current profiles to optimally move and position a selected slider 208 to the desired data track on the associated disk 202. Read and write signals are communicated to and from read/write heads 212 by means of recording channel 226.

The above description of a typical magnetic disk storage system, and the accompanying illustration of FIG. 2 are for representation purposes only. It should be apparent that disk storage systems may contain a large number of disks and actuators, and each actuator may support a number of sliders.

OPERATION

As mentioned above, the present invention concerns a method of robustly resetting the magnetic orientation of a spin valve sensor using internal and external magnetic fields. As shown below, an "internal" magnetic field may be provided by a pulse of electrical current applied to the sensor 100. More importantly, an "external" magnetic field is generated independently of the sensor 100 and applied thereto.

Exemplary Sequence of Operation: Introduction

Figure 3:
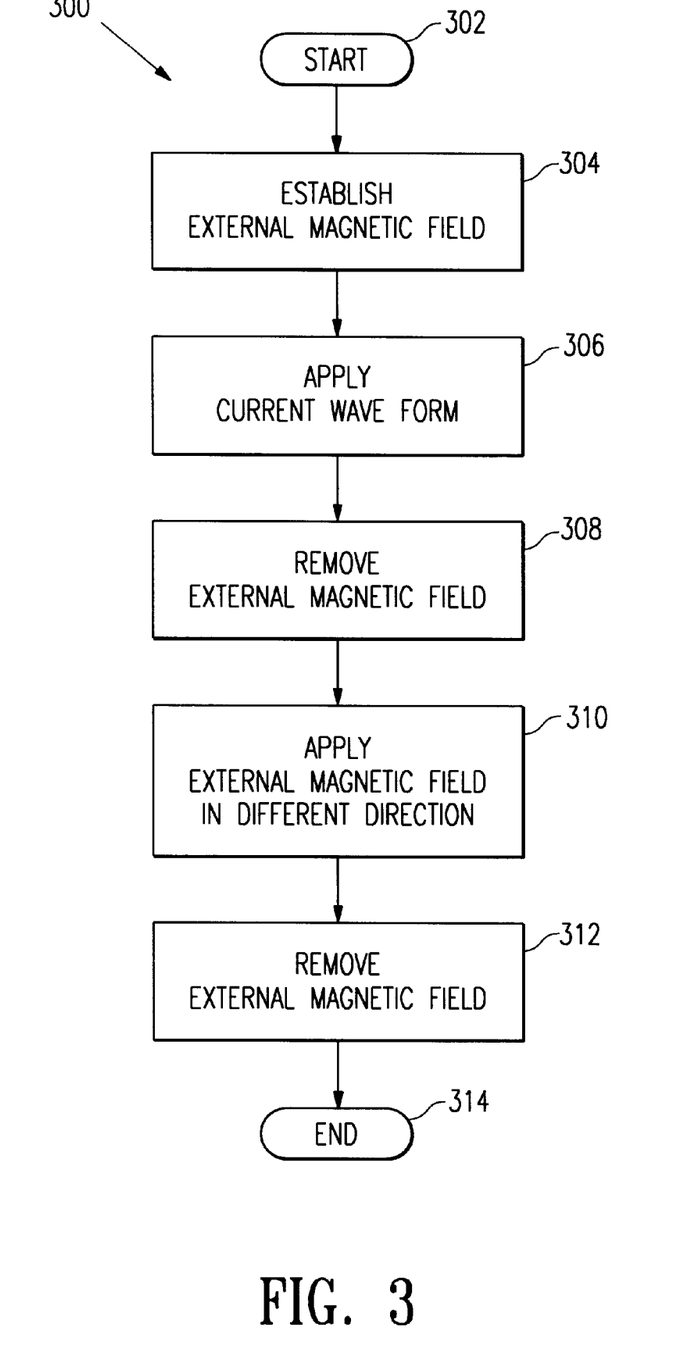
FIG. 3 is a flowchart illustrating a sequence of operational steps for resetting a spin valve sensor according to the invention.
Figure 4:
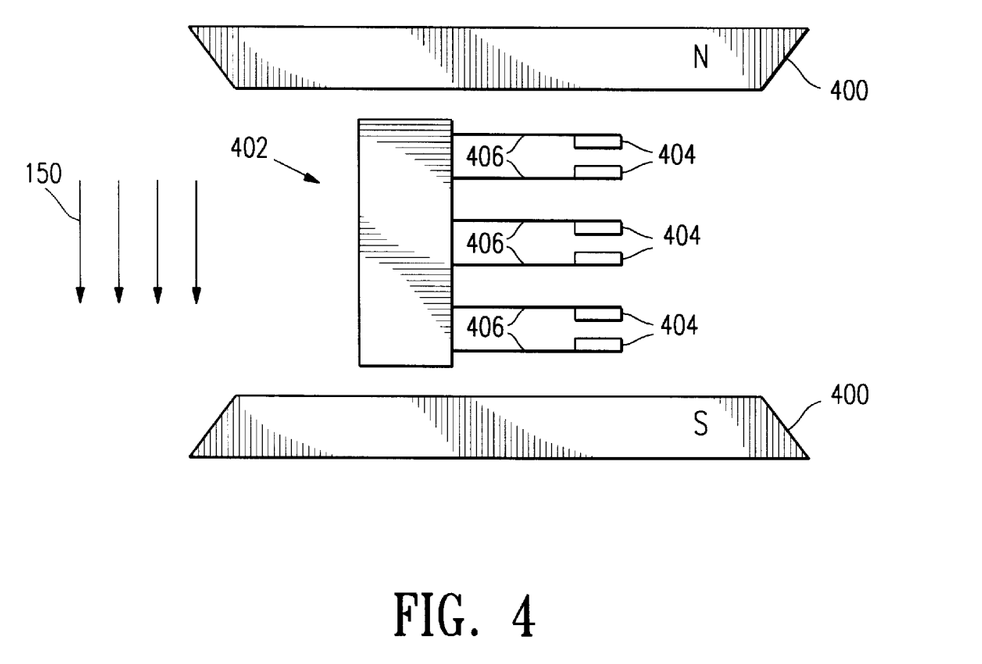
FIG. 4 is a cross-sectional perspective view of an actuator assembly in relation to an external magnetic field according to the invention.

FIG. 3 shows a sequence of method steps 300 to illustrate one example of the method aspect of the invention. The sequence 300 is useful to first establish the magnetic configuration of one or more spin valve sensors during fabrication, assembly, or another stage of the manufacturing process. This process is also useful for resetting the magnetic configuration of sensor(s) after the sensor(s) experience a disorienting high temperature event such as a transient voltage from electrostatic discharge. FIG. 4 depicts one preferred embodiment, where a magnetic field source 400 provides an external magnetic field to reset spin valve sensors of an assembled actuator assembly 402 that includes multiple read or read/write heads 404 mounted on corresponding actuator arms 406. For ease of explanation, then, but without any limitation intended thereby, the routine 300 is described in the context of the hardware environment described above in FIGS. 1–3.

Applying External Magnetic Field

After the routine begins in task 302, the source 400 is operated in task 304 to introduce an external magnetic field to the sensor 100. This external field helps overcome the limitations of previous techniques that relied solely upon the internal magnetic field of a current pulse to magnetically orient spin valve antiferromagnetic layers. In developing the present invention, it has been discovered that the magnetic field supplied by the current-pulsing alone is not completely uniform over the entire active area of the sensor, and also not of sufficient magnitude. This prevents complete recovery of a electrostatically damaged spin valve.

The present invention overcomes potential drawback by using the previously mentioned external magnetic field, which ensures that the sensor 100 is oriented by a uniform sufficiently and powerful field. In the illustrated example, this magnetic field is oriented in a direction parallel to the directions 110–111.

The magnetic source 400 preferably comprises an electromagnet or another source adequate to generate a magnetic field sufficient to robustly orient the antiferromagnetic layer 102 as desired upon the application of a high current heating pulse to the layer 102. As an example, the magnetic field strength is preferably at least 4.5 KOe.

The external magnetic field biases each of the heads 404 in the common direction 150. The assembly 402, however, contains up-facing heads and down-facing heads, as defined by the direction faced by their air bearing surfaces. To accommodate this difference, the heads 404 are preferably operated during disk operations with playback signals from all up-facing or down-facing heads preferably inverted to match the remaining heads' polarity.

Pulse (Heating) Current

Figure 5:
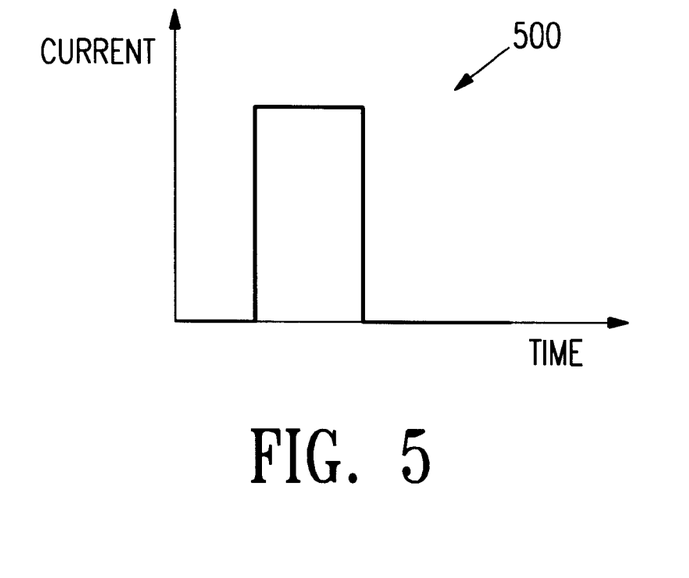
FIG. 5 is a diagram illustrating one exemplary waveform of electrical current applied to a spin valve sensor in accordance with the invention.

After task 304, the pulse current source 123 in task 306 applies a waveform of electrical current, having a predetermined shape, to the sensor 100. This pulse current waveform heats the antiferromagnetic layer 102 past its blocking temperature, thereby freeing the magnetic orientation of this layer as well as the associated ferromagnetic pinned layer 103. If desired, the pulse current may be directed suitably to cooperate with the external magnetic field in aligning the magnetization direction of the antiferromagnetic layer 102. In this embodiment, the pulse current runs from the lead 109 to the lead 108. However, pulse current with an opposite direction may be used if desired, since the internal magnetic field provided by the pulse current is substantially less significant than the external magnetic field. The amplitude and duration of the current pulse are chosen to adequately bring the antiferromagnetic layer 102 past its blocking temperature. According to one embodiment, the pulse current waveform may comprise a square wave pulse 500 as shown in FIG. 5. As an example, the pulse 500 may last for about 50–150 nanoseconds, and have an amplitude of about 17–18 mA.

Experiments show, however, that the current pulse polarity and its width are non-critical when used in conjunction with the external field. This is due to the fact that the purpose of the current pulse is to raise the local temperature while the actual setting of the pinned layer magnetization is accomplished by the external field.

According to a different embodiment of the invention, the pulse current waveform may instead comprise a multi-tiered square wave pulse having different amplitudes at different times. One example is the pulse 600 appearing in FIG. 6. The pulse 600 includes an increased-current portion 602 followed by a reduced-current portion 604. After the increased-current portion 602 heats the antiferromagnetic layer 102 beyond its blocking temperature, the reduced-current portion 604 cooperates with the external magnetic field to establish the desired magnetic orientation of the antiferromagnetic layer 102. The use of the reduced-current portion 604 also saves energy and helps avoid damage to the sensor 100.

Figure 6:
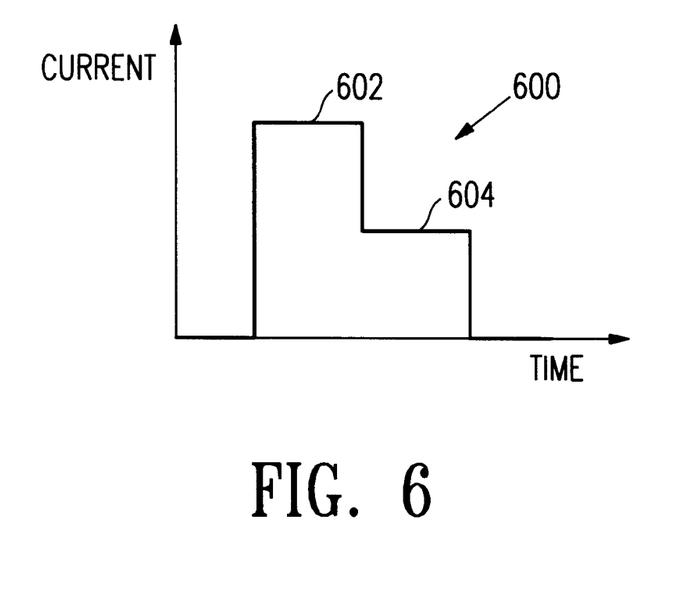
FIG. 6 is a diagram illustrating a different example of electrical current applied to a spin valve sensor in accordance with the invention.

In addition to the waveform shapes 500–600, ordinarily skilled artisans having the benefit of this disclosure will recognize that many other waveform shapes can be utilized without departing from the scope of the present invention.

After completion of the pulse current, the antiferromagnetic layer 102 cools below its blocking temperature, fixing its magnetic orientation in the direction 110. The ferromagnetic pinned layer 103 is oriented in a parallel direction 111 due to its high exchange coupling with the antiferromagnetic layer 102.

Applying Second Magnetic Field

Following application of the current source in task 306, task 308 removes the external magnetic field. Next, in task 310 a different external magnetic field is applied to the sensor 100 to orient the hard bias layers 115–116 in the direction 113. This field may be generated by the magnetic field source 400, for example, or a different source if desired. As an example, the field strength is preferably at least 4.5 KOe, and lasts for a sufficient time to orient the hard bias layers 115 and 116 with the applied magnetic field. Coupling between the hard bias layers 115 and 116 and the free layer 105 biases the free layer in the direction 113 during its quiescent state.

After task 310, the magnetic field from task 310 is removed, and then the routine 300 ends in task 314.

OTHER EMBODIMENTS

While there have been shown what are presently considered to be preferred embodiments of the invention, it will be apparent to those skilled in the art that various changes and modifications can be made herein without departing from the scope of the invention as defined by the appended claims. For example the specifically disclosed directions of magnetization orientations, magnetic fields, and the like may be reversed. Thus, the response of the sensor 100 to external magnetic fields would be opposite that shown.

What is claimed is:

1. A method for establishing a predetermined magnetic orientation of spin valve sensor in a read head, the method comprising:

applying a first external magnetic field to the spin valve sensor, the first external magnetic field having a first orientation parallel to the desired magnetic orientation of the spin valve sensor;

during application of the first external magnetic field, directing a pulse of electrical current with sufficient amplitude and duration through the spin valve sensor to heat the spin valve sensor above its blocking temperature;

after said pulse duration, removing the first external magnetic field; and after removing the first external magnetic field, applying a second external magnetic field to the spin valve sensor for a predetermined time and then removing the second external magnetic field, the second external magnetic field having a second orientation different from the first orientation relative to the spin valve sensor.

2. The method of claim 1, the first external magnetic field being applied prior to directing the pulse of electrical current through the spin valve sensor.

3. The method of claim 1, the pulse of electrical current having a square wave shape.

4. The method of claim 1, the pulse of electrical current comprising a waveform of electrical current having multiple different levels of amplitude.

5. The method of claim 1 wherein the first external magnetic field has sufficient strength to orient the spin valve sensor in the desired magnetic orientation when the spin valve sensor is heated above its blocking temperature.

6. The method of claim 1, the second orientation being substantially perpendicular to the first orientation.

7. The method of claim 1 wherein the second external magnetic field has strength equivalent to the first external magnetic field strength.

8. The method of claim 1, the second external magnetic field having a field strength of about 4.5 KOe.

9. The method of claim 1, the pulse of electrical current having a magnitude of about 14–22 mA.

10. The method of claim 1, the pulse of electrical current having a duration of about 50–150 nanoseconds.

11. A method for establishing a predetermined magnetic orientation of spin valve sensor in a read head, the method comprising:

applying a first external magnetic field to the spin valve sensor, the first external magnetic field having a first orientation parallel to the desired magnetic orientation of the spin valve sensor;

during application of the first external magnetic field, directing a pulse of electrical current with sufficient amplitude and duration through the spin valve sensor to heat the spin valve sensor above its blocking temperature;

after said pulse duration, removing the first external magnetic field;

after the spin valve sensor has cooled below its blocking temperature, applying a second external magnetic field to the spin valve sensor in a second orientation for a predetermined time and then removing the second external magnetic field, the second orientation being different than the first orientation relative to the spin valve sensor.

12. The method of claim 11 wherein the second orientation is substantially perpendicular to the first orientation.

13. The method of claim 11 wherein the pulse of electrical current comprises a waveform of electrical current having a square wave shape.

14. The method of claim 11 wherein the pulse of electrical current comprises a waveform of electrical current having multiple different levels of amplitude.

15. The method of claim 13 wherein the waveform of electrical current has a magnitude of about 14–22 mA and a duration of about 50–150 nanoseconds.

* * * * *